UNITED STATES PATENT OFFICE.

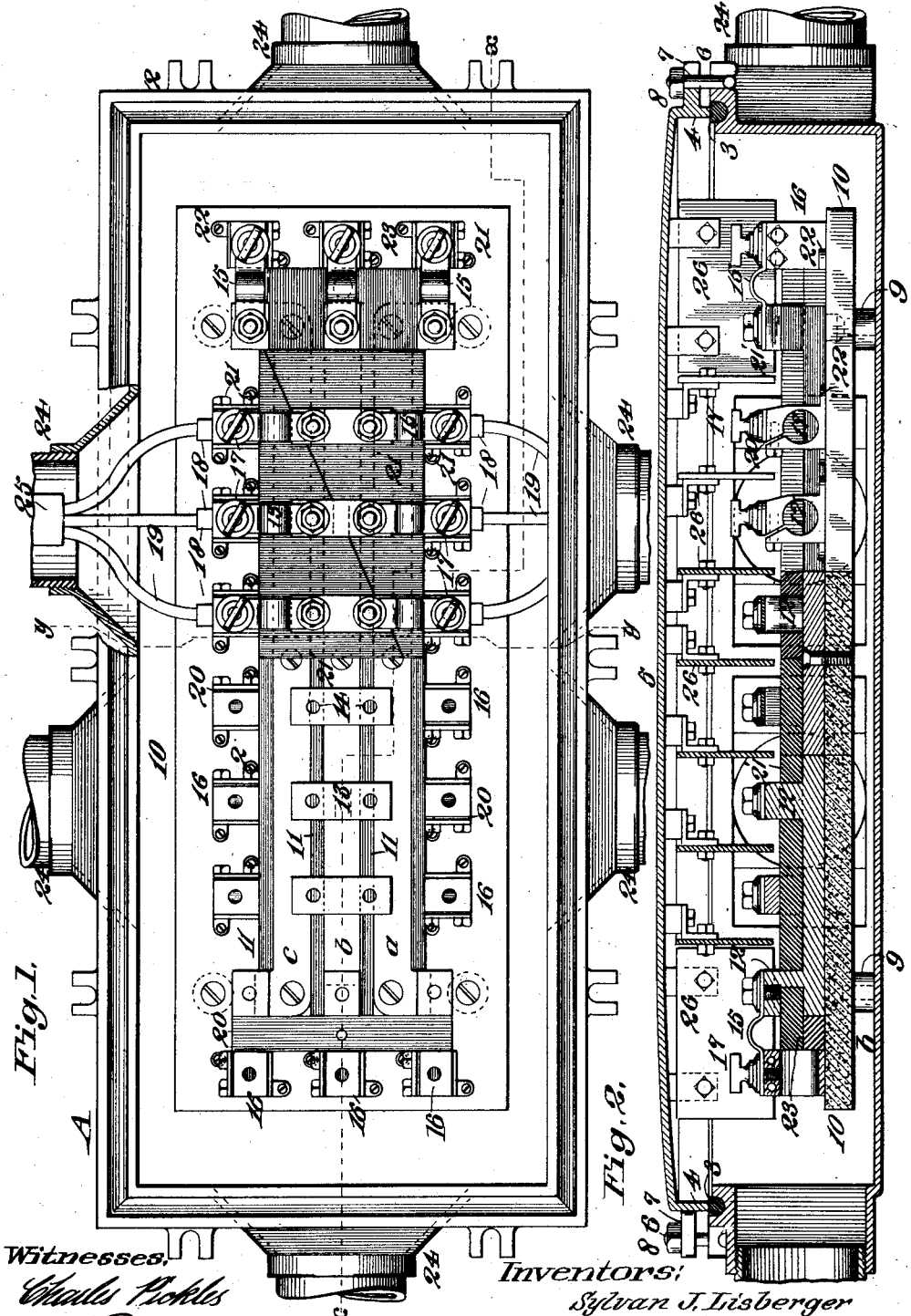

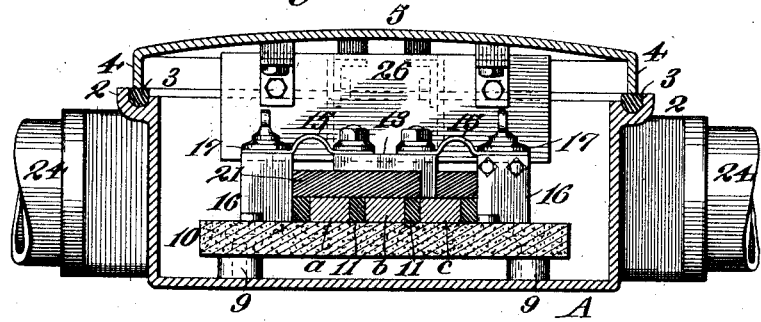

SYLVAN J. LISBERGER AND CHARLES J. WILSON, OF SAN FRANCISCO, CALIFORNIA, ASSIGNORS TO THE PACIFIC GAS AND ELECTRIC COMPANY, OF SAN FRANCISCO, CALIFORNIA, A CORPORATION OF CALIFORNIA.

UNDERGROUND ELECTRICAL JUNCTION-BOX.

1,010,278.      Specification of Letters Patent.      Patented Nov. 28, 1911.

Application filed February 23, 1911. Serial No. 610,165.

*To all whom it may concern:*

Be it known that we, SYLVAN J. LISBERGER and CHARLES J. WILSON, both citizens of the United States, residing in the city and county of San Francisco and State of California, have invented new and useful Improvements in Underground Electrical Junction-Boxes, of which the following is a specification.

This invention relates to a junction box and particularly pertains to a three-phase, low voltage six-way junction box for use in the manholes of underground conduit systems employed in electrical distribution.

It is the object of this invention to provide a junction box which is simple in construction and which is so designed and arranged as to occupy but small space.

A further object is to provide a junction box which is so constructed as to effectually exclude moisture, and which is readily accessible for repairs and for the insertion and connection of electrical conductors, links and fuses.

Another object is to provide a simple and compact means for mounting the conductor terminals in the junction box and means for insulating the various conducting parts from each other.

The invention consists of the parts and the combination and construction of parts as hereinafter more fully described and claimed, having reference to the accompanying drawings, in which—

Figure 1 is a plan view of the junction box with the cover removed. Fig. 2 is a vertical section on the line $x\ x$, Fig. 1. Fig. 3 is a cross section on the line $y\ y$, Fig. 1. Fig. 4 is a detail in perspective of the insulating bridge. Fig. 5 is a detail in perspective of a portion of the bus bars. Fig. 6 is a perspective view of the binding post or terminal block employed in this invention. Fig. 7 is a perspective view of one of the insulating slabs 23.

In the drawings A represents a shallow box or housing on the upper edge of the sides and ends of which is formed an outwardly projecting flange 2. This flange 2 is recessed on its upper face to receive a soft rubber gasket 3 on which the lower edge of a downwardly projecting flange 4, formed on the perimeter of a cover 5 is adapted to rest.. This cover 5 is designed to close the box A and is held in place thereon by means of hinged bolts 6 mounted on the sides and ends of the box A, these bolts extending upward between lugs 7 formed on the edge of the cover 5 and are threaded on their upper ends to receive nuts 8. The cover 5 is clamped tightly upon the gasket 3 by tightening the nuts 8, so as to prevent the passage of moisture between the cover and the box A.

Mounted on spacings, blocks or bosses 9 on the bottom of the box A is a flat slab 10 formed of any suitable non-conducting material, such as slate, porcelain, marble or composition. This slab 10 extends approximately the length and breadth of the box A and is designed to support the conducting devices and insulate them from the bottom of the box A.

A series of peculiarly shaped bus bars, in this case three in number, are mounted on the slab 10. These bus-bars, lettered $a$—$b$—$c$, are arranged parallel to each other and extend lengthwise of the slab 10, with their ends terminating a short distance from the ends of the latter, and are spaced a short distance apart, strips of insulating material 11 being disposed between adjacent bus-bars and alongside the outer face of the bars $a$—$c$—, as shown in Fig. 3. Formed on each of the bus-bars $a$—$b$—$c$ is a pair of vertically disposed projections or posts 12, particularly shown in Fig. 5, these posts 12 being so arranged on the three bus bars as to be offset in relation to each other, that is to say, the end post on the bus bar $c$ is disposed some distance to one side of the end post on the bus bar $b$, which in turn is some distance to one side of a post on the bus bar $a$, which arrangement is repeated throughout the remainder of the length of the bus bars.

Horizontally extending brackets or plates 13 are formed on each of the posts 12 on the bus bars $a$—$b$—$c$; the brackets 13 on the posts 12 on the bar $a$ extending over the bars $b$ and $c$, those on the posts on the bar $b$ extending on each side of the posts and projecting over the bars *a* and *c*, while the brackets on the posts on the bar *c* extend over the bars *a—b*, as clearly shown in Fig. 5. These brackets 13, by being arranged as just described, are alined in relation to each other, and are designed to serve as contact blocks for fuse terminals, each bracket 13 being tapped at 14 on its upper face near its ends to receive binding screws for attaching plate fuses 15 thereto. The fuses 15 extend outward from each end of the brackets 13 and are clamped at their outer ends on specially constructed terminal blocks 16 adjacent the insulating strip 11, by means of screws or thumb nuts 17, as shown in Fig. 1.

Each terminal block 16 is constructed as shown in Fig. 6, and consists of a substantially cubical block of suitable conductive material. This block 16 is bored horizontally at 17 to receive the ferrule 18 on the terminal of a conductor 19, and is slotted with a diagonally arranged slot 20 which extends through the block from the upper face thereof to the bore 17; this slot being provided to admit of a slight expansion and contraction of the block. A pair of screws 21 enter the block from one side, extend across the slot 20, and are threaded into the block material above the bore 17; these screws being provided for the purpose of contracting the bore 17 to clamp the ferrule 18 therein. Formed on the lower edge of the block, adjacent diagonally opposite corners thereof, are laterally extending lugs 22 through which screws are inserted to securely attach the block to the slab 10. By thus constructing the terminal blocks 16 we obtain a block which is extremely compact, a quality which is particularly desirable in a device of this character, where space is an element, and which permits of ready removal and replacement in event of the contact surface being lowered or otherwise damaged.

The outer ends of the bus bars *a—b—c* are each provided with a bracket or fuse block 13', similar to the bracket 13, from which fuses 15 extend to terminal blocks 16 disposed a short distance from the ends of the bus bars and separated therefrom by an insulating bar 20.

Means are provided for insulating the extended portions of the brackets 13 and fuses 15 from the bus bars therebeneath, which means consists of flat and substantially triangular-shaped slabs 21', of any suitable non-conducting material, which are notched at 22 on their long edge in such manner that when the slabs are slipped beneath the overhanging brackets 13 from each side of the posts 12, the posts will extend through the notches 22 and the edge of one slab adjacent the notches will contact the edge of the other slab, to form a complete insulated covering for the bus bars *a—b—c*, as shown in Fig. 1, beneath the brackets 13. The posts of the brackets 13' on the ends of the bus bars are insulated from each other by means of insulating slabs 23 which are notched at 23', Fig. 7, to pass around the posts and are placed in position from the ends of the bus bars.

The terminals of the conductors 19 are brought into the interior of the box A through nipples 24 tapped in the sides and ends thereof, as shown in Fig. 1, the lead covering 25 of each set of conductors being wiped to the nipple 24 in the usual manner, so as to prevent the passage of moisture at this point. The three conductors 19 leading from a cable 25 are connected to three successive terminal blocks 16 which are connected through fuses 15 to the bus bars *a—b—c—* respectively, as shown in Fig. 1, from which it will be seen that the three separate conductors in each cable will be connected to the three separate bus bars.

As a means of preventing short circuiting in event any of the fuses 15 burned out, a series of insulating barriers 26 are mounted on the underside of the cover 5 in such manner as to extend between the fuses 15 and the brackets 13—13', as shown in Fig. 2.

It will be noted that by the peculiar construction of the outermost bus bars *a—c*, that they may be formed from one pattern and are inter-changeable. It will also be observed that these bus bars *a—b—c* are each formed in one piece, the bus bars, posts and brackets being integral, thus avoiding the use of joints, either soldered or otherwise connected.

Having described our invention what we claim and desire to secure by Letters Patent is—

1. In a device of the character described, the combination with a box and a closure therefor, of a non-conducting slab mounted in said box, a series of bus-bars on said slab insulated from each other, a series of posts on said bus-bars having overhanging brackets on their upper ends, said brackets on each bus-bar extending over the adjacent bus-bar, an insulating slab disposed between the brackets and the bus-bars, a series of terminal blocks on said slab opposite each bracket, and fuses extending between said brackets and said terminal blocks.

2. In a device of the character described, the combination with a box and a closure therefor, of a non-conducting slab mounted in said box, a series of bus-bars on said slab insulated from each other, a series of posts on said bus-bars having overhanging brackets on their upper ends, said brackets on each bus-bar extending over the adjacent bus-bar, an insulating slab disposed between the brackets and the bus-bars, a series of terminal blocks on said slab opposite each bracket, fuses extending between said brackets and said terminal blocks, and insulating barriers on the closure of the box extending between adjacent brackets and fuses.

In testimony whereof we have hereunto set our hands in the presence of two subscribing witnesses.

SYLVAN J. LISBERGER.
CHARLES J. WILSON.

Witnesses:
A. H. CAINE,
J. G. BUBB.

Copies of this patent may be obtained for five cents each, by addressing the "Commissioner of Patents, Washington, D. C."